US006987633B2

(12) United States Patent
Hutchins

(10) Patent No.: US 6,987,633 B2
(45) Date of Patent: Jan. 17, 2006

(54) APPARATUS AND METHOD TO READ INFORMATION FROM A TAPE STORAGE MEDIUM

(75) Inventor: Robert A. Hutchins, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 105 days.

(21) Appl. No.: 10/683,519

(22) Filed: Oct. 10, 2003

(65) Prior Publication Data

US 2005/0078398 A1 Apr. 14, 2005

(51) Int. Cl.
*G11B 5/02* (2006.01)

(52) U.S. Cl. .......................... 360/67

(58) Field of Classification Search .................. 360/46, 360/47, 39, 53, 31, 65, 51; 324/210, 212
See application file for complete search history.

(56) References Cited

U.S. PATENT DOCUMENTS 3,909,735 A 9/1975 Anderson et al. ........... 329/122
4,007,429 A 2/1977 Cadalora et al. .............. 331/17
4,613,825 A 9/1986 Bickley et al. ................ 331/4
4,636,736 A 1/1987 Woodworth et al. .......... 329/50
4,855,689 A 8/1989 Kinkel ........................ 331/17
4,928,075 A 5/1990 Leis ............................ 331/17
5,442,315 A 8/1995 Hutchins .................... 327/159
6,246,733 B1 * 6/2001 Hutchins ..................... 360/51
6,538,518 B1 3/2003 Chengson .................... 331/17
6,836,511 B1 * 12/2004 Marukawa .................. 375/232
2002/0021519 A1 * 2/2002 Rae ............................ 360/51
2004/0218300 A1 * 11/2004 Howarth et al. .............. 360/39

OTHER PUBLICATIONS

"PRML Detection Boosts Hard-Disk Drive Capacity", by Fisher & Abbott, Nov. 1996, IEEE Spectrum, pp. 70-76.*

* cited by examiner

*Primary Examiner*—David Hudspeth
*Assistant Examiner*—Glenda P. Rodriguez
(74) *Attorney, Agent, or Firm*—Dale F. Regelman

(57) ABSTRACT

A method and apparatus to read calibration information from a calibration region encoded in a tape information storage medium while acquiring a plurality of valid calibration signals. The method provides (N) read/detect channels. The method establishes a valid calibration signal threshold, and detects at a first time the (i)th valid calibration signal. The method further determines at the first time the frequency and phase of that (i)th valid calibration signal using a first PLL component disposed in the (i)th read/detect channel. The method determines if the valid calibration signal threshold is exceeded. If the valid calibration signal threshold is exceeded, the method then provides the frequency and phase to a second PLL component, and reads information encoded on the tape medium using that second PLL component.

25 Claims, 12 Drawing Sheets

FIG. 2

| | HEAD TRACK NO. | HEAD MODULE | |
|---|---|---|---|
| | | L | R |
| 201 | 1 | WR | RD |
| | 2 | RD | WR |
| | 3 | WR | RD |
| | 4 | RD | WR |
| | 5 | WR | RD |
| | 6 | RD | WR |
| | 7 | WR | RD |
| | 8 | RD | WR |
| 211 | SERVO | LS1 | RS1 |
| | SERVO | LS2 | RS2 |
| 221 | 9 | WR | RD |
| | 10 | RD | WR |
| | 11 | WR | RD |
| | 12 | RD | WR |
| | 13 | WR | RD |
| | 14 | RD | WR |
| | 15 | WR | RD |
| | 16 | RD | WR |
| 231 | SERVO | LS3 | RS3 |
| | SERVO | LS4 | RS4 |
| 241 | 17 | WR | RD |
| | 18 | RD | WR |
| | 19 | WR | RD |
| | 20 | RD | WR |
| | 21 | WR | RD |
| | 22 | RD | WR |
| | 23 | WR | RD |
| | 24 | RD | WR |
| 251 | SERVO | LS5 | RS5 |
| | SERVO | LS6 | RS6 |
| 261 | 25 | WR | RD |
| | 26 | RD | WR |
| | 27 | WR | RD |
| | 28 | RD | WR |
| | 29 | WR | RD |
| | 30 | RD | WR |
| | 31 | WR | RD |
| | 32 | RD | WR |

200

APPARATUS AND METHOD TO READ INFORMATION FROM A TAPE STORAGE MEDIUM

FIELD OF THE INVENTION

Applicant's invention relates to an apparatus and method to read information from a tape storage medium. In certain embodiments, the invention relates to an apparatus and a method to detect a plurality of valid calibration signals while simultaneously determining the frequency and phase of one or more of those valid calibration signals.

BACKGROUND OF THE INVENTION

Automated media storage libraries are known for providing cost effective access to large quantities of stored media. Generally, media storage libraries include a large number of storage slots on which are stored portable data storage media. The typical portable data storage media is a tape cartridge, an optical cartridge, a disk cartridge, electronic storage media, and the like. By "electronic storage media," Applicant mean a device such as a PROM, EPROM, EEPROM, Flash PROM, compactflash, smartmedia, and the like.

One (or more) accessor(s) typically accesses the data storage media from the storage slots and delivers the accessed media to a data storage device for reading and/or writing data on the accessed media. Suitable electronics operate the accessor(s) and operate the data storage device(s) to provide information to, and/or to receive information from, an attached on-line host computer system.

Prior art apparatus and methods to read information from a magnetic tape information storage medium initially read calibration information from a calibration region on the tape, and identify one or more valid calibration signals. The phase and frequency of the calibration signals are determined only if a sufficient number of valid calibration signals are detected.

Such prior art methods require a lengthy calibration region and a two step process to determine the phase and frequency of the calibration information encoded within the calibration region. What is needed is an apparatus and method to detect a plurality of valid calibration signals while simultaneously determining the phase and frequency of the information encoded in those calibration signals.

SUMMARY OF THE INVENTION

Applicant's invention comprises a method and apparatus to read calibration information from a calibration region disposed on tape information storage medium while acquiring a plurality of valid calibration signals. The method provides (N) read/detect channels, where each of those (N) read/detect channels includes a PLL circuit having a first PLL component interconnected with a second PLL component.

The method establishes a valid calibration signal threshold, and detects at a first time the (i)th valid calibration signal, where (i) is greater than or equal to 1 and less than or equal to (N). The method further determines at the first time the frequency and phase of that (i)th valid calibration signal using the first PLL component disposed in the (i)th read/detect channel. The method determines if the valid calibration signal threshold is exceeded. If the valid calibration signal threshold is exceeded, the method then provides the frequency and phase to the second PLL component, and reads information encoded on the tape medium.

BRIEF DESCRIPTION OF THE DRAWINGS

The invention will be better understood from a reading of the following detailed description taken in conjunction with the drawings in which like reference designators are used to designate like elements, and in which:

FIG. 2 is a block diagram showing the track layout of a magnetic tape head;

DETAILED DESCRIPTION OF THE PREFERRED EMBODIMENTS

Referring to the illustrations, like numerals correspond to like parts depicted in the figures. The invention will be described as embodied in a read channel assembly disposed in a tape drive unit used in a data processing application. The following description of Applicant's invention is not meant, however, to limit Applicant's invention to data processing applications, as the invention herein can be applied to reading information from a tape storage medium in general.

Figure 3:
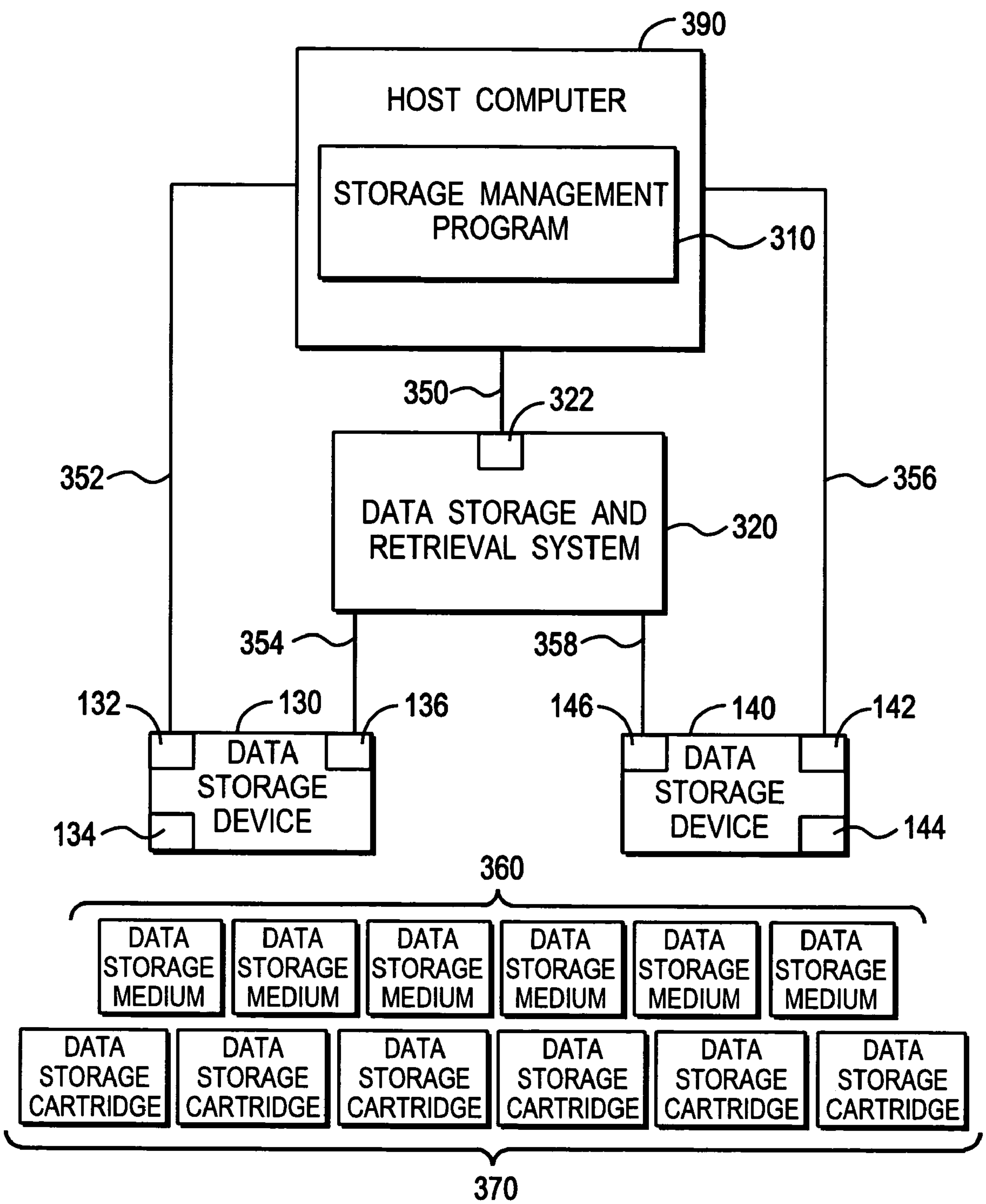
FIG. 3 is a block diagram showing the components of Applicant's data storage and retrieval system.

FIG. 3 illustrates the hardware and software environment in which preferred embodiments of the present invention are implemented. Host computer 390 includes, among other programs, a storage management program 310. In certain embodiments, host computer 390 comprises a single computer. In alternative embodiments, host computer 390 comprises one or more mainframe computers, one or more work stations, one or more personal computers, combinations thereof, and the like.

Information is transferred between the host computer 390 and secondary storage devices managed by a data storage and retrieval system, such as data storage and retrieval system 320, via communication links 350, 352, and 356. Communication links 350, 352, and 356, comprise a serial interconnection, such as an RS-232 cable or an RS-422 cable, an ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, combinations thereof, and the like.

In the embodiment shown in FIG. 3, data storage and retrieval system 320 includes data storage devices 130 and 140. In alternative embodiments, Applicant's data storage and retrieval system 320 includes a single data storage device. In alternative embodiments, Applicant's data storage and retrieval system 320 includes more than two data storage devices.

A plurality of portable tape storage media 360 are moveably disposed within Applicant's data storage and retrieval system. In certain embodiments, the plurality of tape storage media 360 are housed in a plurality of portable tape cartridges 370. Each of such portable tape cartridges may be removeably disposed in an appropriate data storage device.

Data storage and retrieval system 320 further includes program logic to manage data storage devices 130 and 140, and plurality of portable tape cartridges 370. In certain embodiments, each data storage device includes a controller, such as controller 136/146, comprising such program logic. In certain embodiments, a library controller, such as controller 160 (FIG. 1) comprises such program logic.

In alternative embodiments, data storage and retrieval system 320 and host computer 390 may be collocated on a single apparatus. In this case, host computer 390 may be connected to another host computer to, for example, translate one set of library commands or protocols to another set of commands/protocols, or to convert library commands from one communication interface to another, or for security, or for other reasons.

Data storage and retrieval system 320 comprises a computer system, and manages, for example, a plurality of tape drives and tape cartridges. In such tape drive embodiments, tape drives 130 and 140 may be any suitable tape drives known in the art, e.g., the TotalStorage® 3590 tape drives (Magstar and TotalStorage are registered trademarks of IBM Corporation). Similarly, tape cartridges 370 may be any suitable tape cartridge device known in the art, such as ECCST, Magstar®, TotalStorage® 3420, 3480, 3490E, 3580, 3590 tape cartridges, etc.

Figure 1:
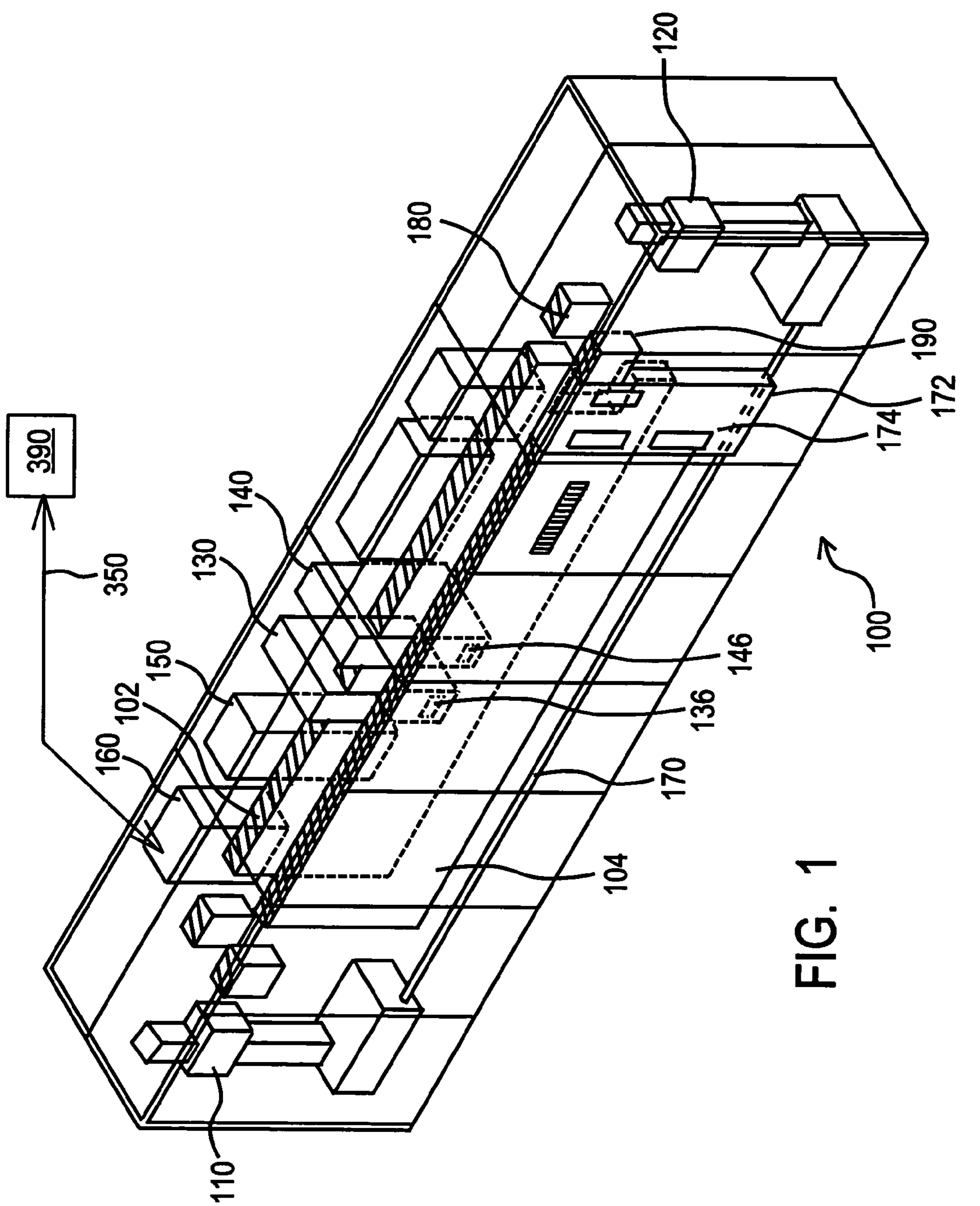
FIG. 1 is a perspective view of a first embodiment of Applicant's data storage and retrieval system.

Referring now to FIG. 1, automated data storage and retrieval system 100 is shown having a first wall of storage slots 102 and a second wall of storage slots 104. Portable data storage media are individually stored in these storage slots. In certain embodiments, such data storage media are individually housed in portable container, i.e. a cartridge. Examples of such data storage media include magnetic tapes, magnetic disks of various types, optical disks of various types, electronic storage media, and the like.

Applicant's automated data storage and retrieval system includes one or more accessors, such as accessors 110 and 120. As shown in FIG. 1, accessors 110 and 120 travel bi-directionally along rail 170 in an aisle disposed between first wall of storage slots 102 and second wall of storage slots 104. An accessor is a robotic device which accesses portable data storage media from first storage wall 102 or second storage wall 104, transports that accessed media to data storage devices 130/140 for reading and/or writing data thereon, and returns the media to a proper storage slot. Data storage device 130 includes data storage device controller 136. Data storage device 140 includes data storage device controller 146.

Device 160 comprises a library controller. In certain embodiments, library controller 160 is integral with a computer. Operator input station 150 permits a user to communicate with Applicant's automated data storage and retrieval system 100. Power component 180 and power component 190 each comprise one or more power supply units which supply power to the individual components disposed within Applicant's automated data storage and retrieval system. Import/export station 172 includes access door 174 pivotably attached to the side of system 100. Portable data storage cartridges can be placed in the system, or in the alternative, removed from the system, via station 172/access door 174.

In the embodiments wherein data storage drive 130 and/or 140 comprises a tape drive unit, that tape drive unit includes, inter alia, a tape head. Referring now to FIG. 2, multi-element tape head 200 includes a plurality of read/write elements to record and read information onto and from a magnetic tape. In certain embodiments, magnetic tape head 200 comprises a thin-film magneto-resistive transducer. In an illustrative embodiment, tape head 200 may be constructed as shown in FIG. 2. The length of the tape head 200 substantially corresponds to the width of a magnetic tape. In certain embodiments tape head 200 includes thirty-two read/write element pairs (labeled "RD" and "WR") and three sets of servo read elements, corresponding to the three servo areas written to the magnetic tape. In the illustrated embodiment, the thirty-two read/write element pairs are divided into groups of eight, i.e. groups 201, 221, 241, and 261.

Tape head 200 further includes a plurality of servo sensors to detect servo signals comprising prerecorded linear servo edges on the magnetic tape. In the embodiment of FIG. 2, adjacent groups of 8 read/write pairs are separated by two tracks occupied by a group of four servo sensors. Each group of four servo sensors may be referred to as a "servo group", e.g. servo group 211, servo group 231, and servo group 251.

In the illustrated embodiment, tape head 200 includes left and right modules separately fabricated, then bonded together. Write and read elements alternate transversely down the length of each module (i.e., across the width of the tape), beginning with a write element in position on the left module and a read element in the corresponding position on the right module. Thus, each write element in the left module is paired with a read element in the corresponding position on the right module and each read element in the left module is paired with a write element in the corresponding position on the right module such that write/read element pairs alternate transversely with read/write element pairs.

Figure 4A:
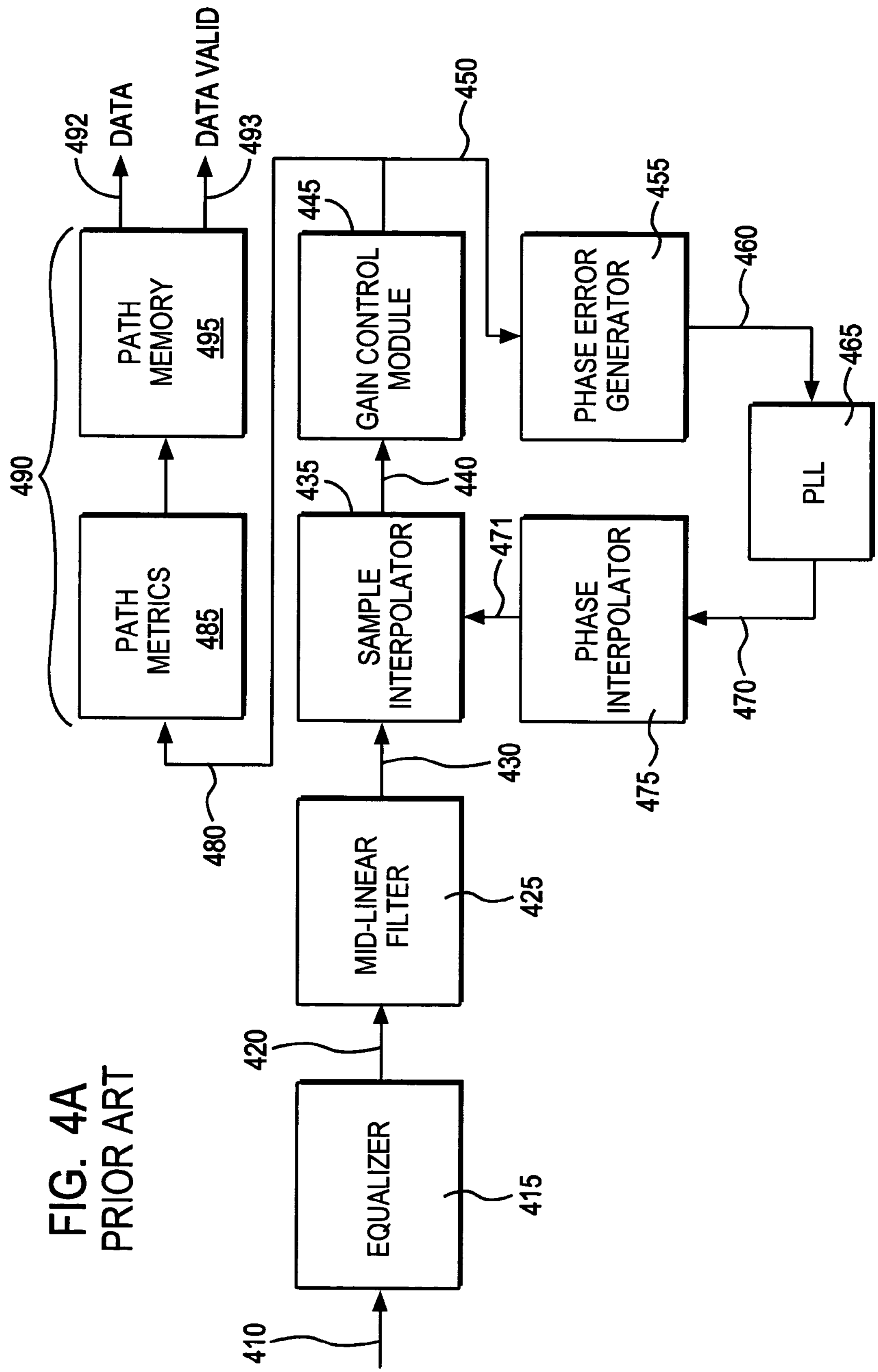
FIG. 4A is a block diagram showing the architecture of a prior art read channel assembly used in a tracking mode.

FIG. 4A shows the architecture and data flow of a prior art asynchronous read detect channel used in a tracking mode. In the illustrated embodiment of FIG. 4A, the asynchronous read channel includes equalizer 415, mid-linear filter 425, sample interpolator 435, gain control module 445, phase-error generator 455, PLL circuit 465, phase interpolator 475, path metrics module 485, and path memory 495. In certain embodiments, path metrics module 485 in combination with path memory 495 comprises an assembly known as a maximum likelihood detector, such as maximum likelihood detector 490.

When reading information from a magnetic tape using a read head, such as read/write head 200, a waveform comprising that information is formed. A first waveform is provided to equalizer 415 using communication link 410. In certain embodiments, equalizer 415 comprises a finite impulse response ("FIR") filter. Such a FIR filter shapes the first waveform to produce a second signal.

The second signal formed in equalizer 415 is provided to mid-linear filter 425 using communication link 420. Mid-linear filter 425 determines the value of the equalized signal at the middle of the sample cell. Mid-linear filter 425 produces a third signal which includes the equalized signal and the value of the equalized signal at the middle of the sample cell.

The third signal formed in mid-linear filter 425 is provided to sample interpolator 435 via communication link 430. Sample interpolator 435 receives the third signal from mid-linear filter 425 and using the output of PLL circuit 465 estimates the equalized signal at the synchronous sample time. By synchronous sample time, Applicant means the time when the bit cell clock arrives. PLL circuit 465 provides this time. Sample interpolator 435 provides one or more fourth, synchronous signals.

The one or more fourth digital, synchronous signals formed by sample interpolator 435 are provided to gain control module 445 via communication link 440. Gain control module 445 adjusts the amplitude of the one or more fourth signals to form one or more fifth signals having amplitudes set to preset levels required by the maximum likelihood detector 490. In the illustrated embodiment, the maximum likelihood detector 490 comprises path metrics module 485 and path memory 495. The one or more fifth signals are provided to maximum likelihood detector 490 via communication link 480. The output of the maximum likelihood detector is data on communication link 492 and a data valid signal on communication link 493.

The read channel of FIG. 4A, includes a feedback loop comprising phase error generator 455, PLL circuit 465, and phase interpolator 475. The one or more fifth signals formed by gain control circuit 445 are provided to phase-error generator 455 via communication link 450. Phase-error generator 455 estimates the phase of the one or more fifth signals and generates an error signal that is provided to PLL circuit 465 via communication link 460.

The phase-error is processed by PLL circuit 465 which filters the phase-error and determines the locations of the synchronous bit cell boundaries. The locations of the synchronous bit cell boundaries are provided to phase interpolator 475 and sample interpolator 435 via communication links 470 and 471, respectively.

Figure 4B:
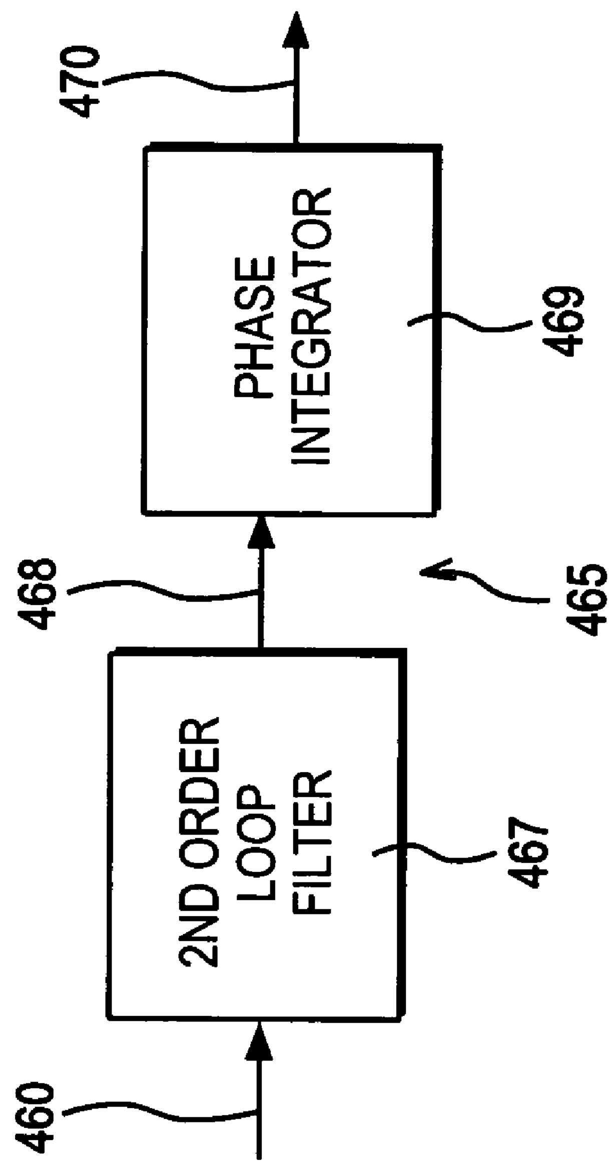
FIG. 4B is a block diagram showing the PLL circuit in the read channel of FIG. 4A.

FIG. 4B shows the components of PLL circuit 465. PLL circuit 465 includes loop filter 467 and phase integrator 469. Communication link 468 interconnects loop filter 467 and phase integrator 469. Loop filter 467 filters the phase error input provided by the phase error generator 455 and controls the overall loop response. Phase integrator 469 controls the output phase and frequency of the phase lock loop.

Figure 5A:
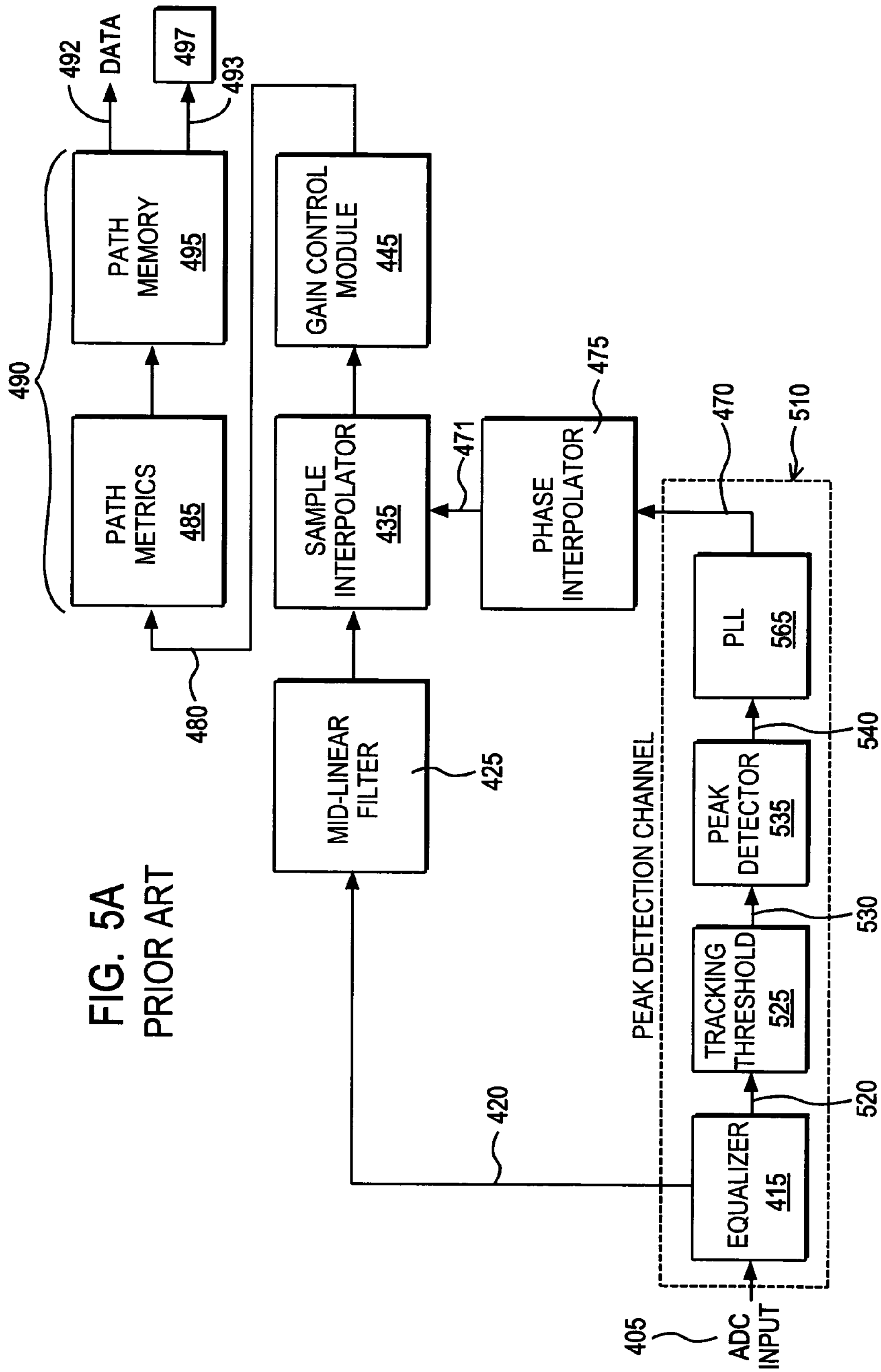
FIG. 5A is a block diagram showing the architecture of a prior art read channel assembly when used in a peak detection or acquisition mode.

FIG. 5A shows the architecture and data flow of a prior art asynchronous read detect channel assembly used in a "peak detection" or acquisition mode. In the illustrated embodiment of FIG. 5A, the read channel includes peak detection channel 510 comprising equalizer 415, tracking threshold module 525, peak detector 535, and PLL circuit 565. Equalizer 415 provides the second signal to tracking threshold module 525 via communication link 520, and to mid-linear filter 425 (FIG. 4) via communication link 420 (FIGS. 4, 5). Tracking threshold module 525 derives a positive and negative threshold level where those threshold levels comprise some fraction of the average peak level. The tracking threshold module 525 provides these thresholds to the peak detector 535 along with the equalized signal from the equalizer 415 via communication link 530.

Peak detector 535 determines the locations of the "1"s in the data stream. A "1" occurs if there is a peak and the peak amplitude, either positive or negative, is greater than a positive threshold, or less than a negative threshold, provided by the tracking threshold module 525. Peak detector 535 provides a signal representing the location of the peak and a peak-detected qualifier to the PLL circuit 565 via communication link 540. PLL circuit 565 is interconnected with phase interpolator 475 (FIG. 4) as described above.

In the illustrated embodiment of FIG. 5A, the asynchronous read channel does not include a feedback loop from the gain control module 445 (FIGS. 4, 5) to the phase-error generator 455, PLL circuit 565, phase interpolator 475, and sample interpolator 435. The architecture of FIG. 5A allows a fast acquisition mode, i.e. peak detection mode, wherein PLL circuit 565 is rapidly "locked," and the gain adjusted. By "locking" the PLL circuit, Applicant means locking onto the phase and frequency of the waveform comprising the information read from one or more tape channels, and then defining the bit cell boundaries separating individual data bits.

Figure 5B:
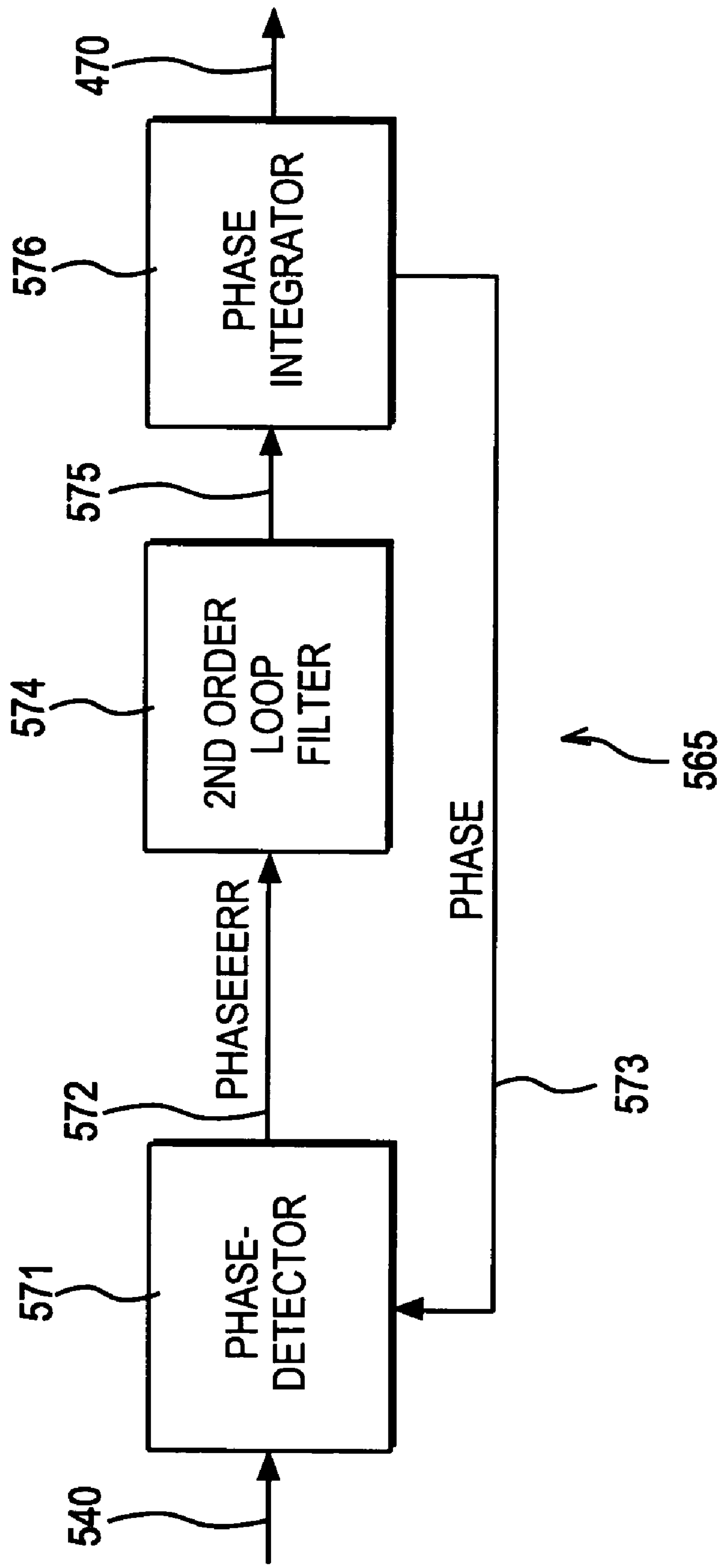
FIG. 5B is a block diagram showing the PLL circuit in the read channel of FIG. 5A information encoded on a tape storage medium.

FIG. 5B shows the components of PLL circuit 565. PLL circuit 565 includes phase detector 571, loop filter 574, and phase integrator 576. Phase detector 571 receives the signal from peak detector 535 via communication link 540. Phase detector 571 compares the phase of the peak and the phase of the bit cell and generates an error signal, and provides that signal to loop filter 574. Loop filter 574 filters that phase error signal, and provides that signal to phase integrator 576 via communication link 575. Phase integrator 576 controls the output phase and frequency of the phase lock loop, and provides a signal to phase detector 571 via communication link 573 and a signal to phase interpolator 475 via communication link 470.

Figure 6:
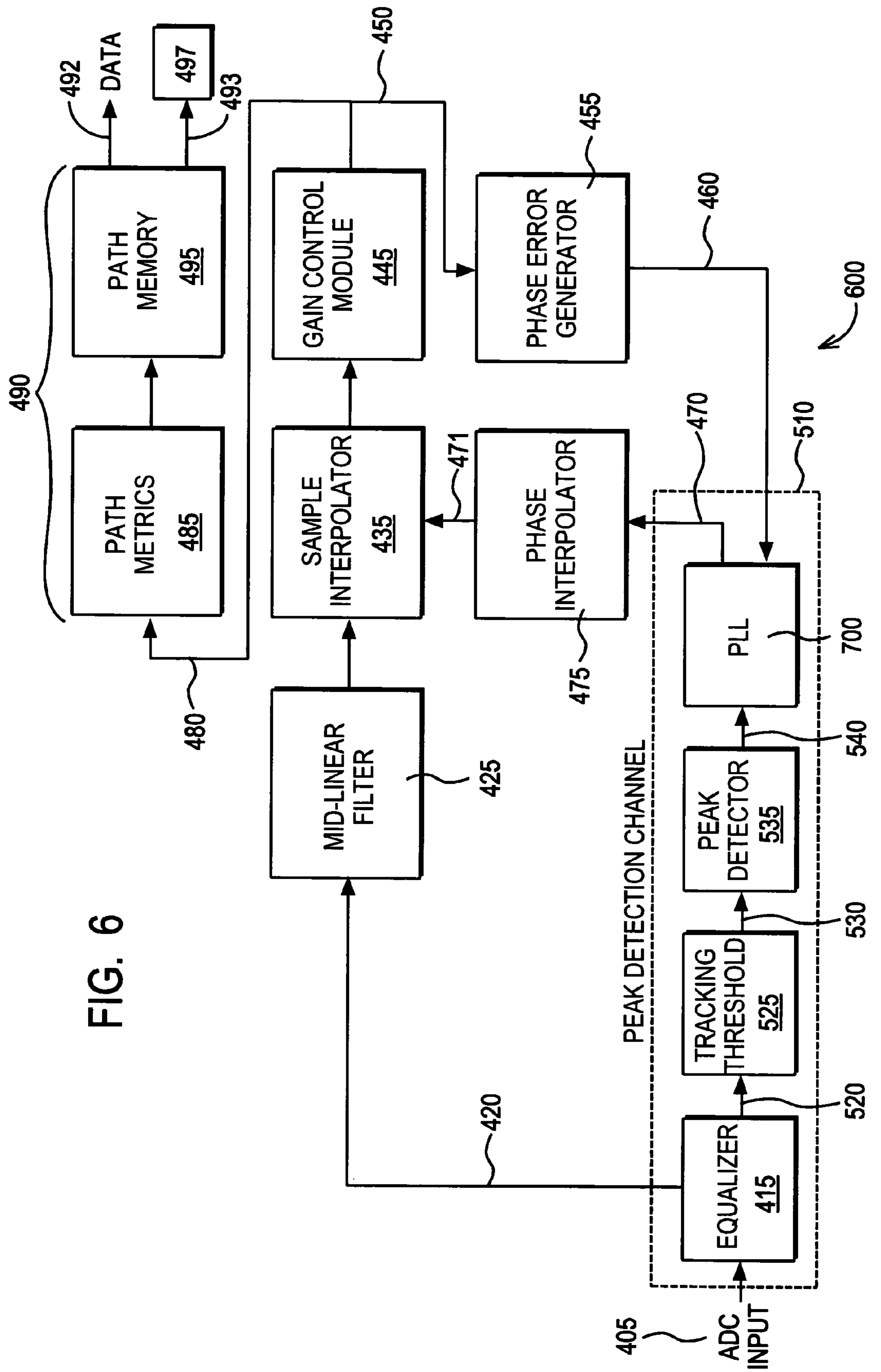
FIG. 6 is a block diagram showing the architecture of Applicant's read channel assembly.

FIG. 6 shows the configuration of Applicant's read/detect channel 600. Using read/detect channel 600, Applicant's method simultaneously operates in both a tracking mode and in an acquisition mode. Read/detect channel 600 includes a peak detection channel and a partial response maximum likelihood ("PRML") block. The peak detection channel comprises equalizer 415, tracking threshold module 525, peak detector 535, and PLL circuit 700. The PRML block includes equalizer 415, mid-linear filter 425, sample interpolator 435, gain control module 445, phase error generator 455, phase interpolator 475, and PLL circuit 700.

Figure 7:
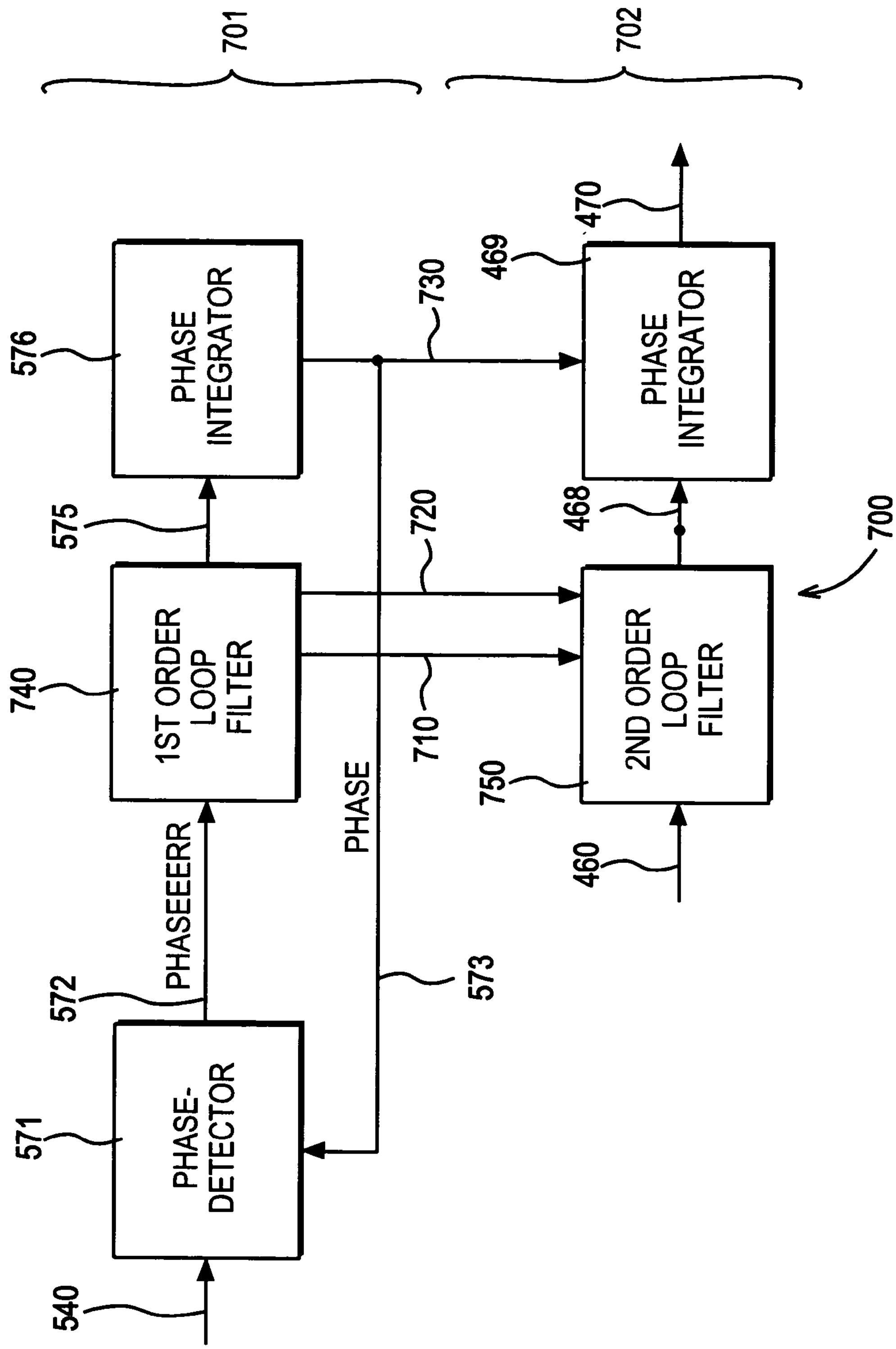
FIG. 7 is a block diagram showing the PLL circuit of Applicant's read channel.

Referring now to FIG. 7, PLL circuit 700 includes phase detector 571 first order loop filter 740, and phase integrator 576. Phase detector 571 receives a signal from peak detector 535. Phase detector 571 provides an phase error signal to first order loop filter 740. First order loop filter provides an estimate of the bit cell size to phase integrator 576 via communication link 575. First order loop 740 filter also comprises a number of registers and provides that register information to second order loop filter 750 via communication links 710 and 720.

First order loop filter 740 is used for signal acquisition. Second order loop filter 750 is used for tracking, i.e. for reading data from the tape medium. First order loop filter 740 uses a first gain. Second order look filter 750 uses a second gain, where the first gain is greater than the second gain.

As those skilled in the art will appreciate, signal acquisition is performed while the tape head is reading a pattern comprising alternating "1"s and "0"s. Such a signal is sometimes referred to as a VFO signal. Such a VFO signal comprises a very regular pattern having very little noise. Using a higher gain in first order loop filter 740 allows PLL circuit 700 to lock onto the VFO signal rapidly. By "locking on," Applicant means determining the frequency and phase of the calibration signal, where that calibration signal comprises peak location information provided by the peak detection channel.

Second order loop filter 750 employs less gain while data is being read from the tape. Signals comprising data are noisier than the VFO signal. Using less gain in second order loop filter 750 facilitates differentiating between a valid signal and noise in the signal provided by the PRML block.

Second order loop filter 750 receives an input signal from phase error generator 455 via communication link 460. Second order loop filter provides a signal to phase integrator 469 via communication link 468. Phase integrator 469 controls output phase and frequency of the phase lock loop, and provides that information to phase interpolator 475 via communication link 470.

Figure 8:
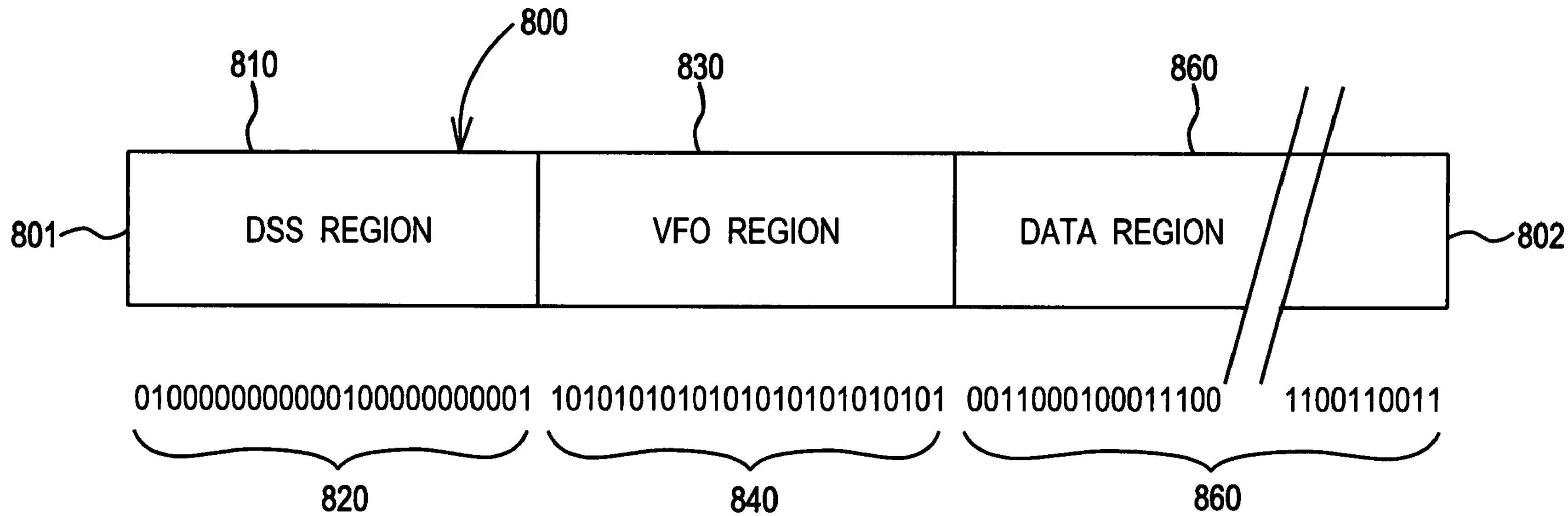
FIG. 8 is a block diagram showing typical formatting used in magnetic tape storage media.

FIG. 8 shows a typical tape formatting used in magnetic tapes. Referring now to FIG. 8, magnetic tape 800 includes first end 801 and second end 802. Disposed between first end 801 and second end 802 are, among other regions, a DSS region 810, a VFO region 830, and a data region 850.

Pattern 820 is typically encoded in the DSS region. DSS region 810 is a calibration field with a low frequency of "1"s. Generally, user data is not encoded in DSS region 810. Pattern 840 is typically encoded in the VFO region. VFO region 840 is a calibration field comprising a pattern of alternating "1"s and "0"s. Generally, user data is not encoded in VFO region 830. Data region 850 includes the user data 860 encoded on the tape medium.

Figure 9:
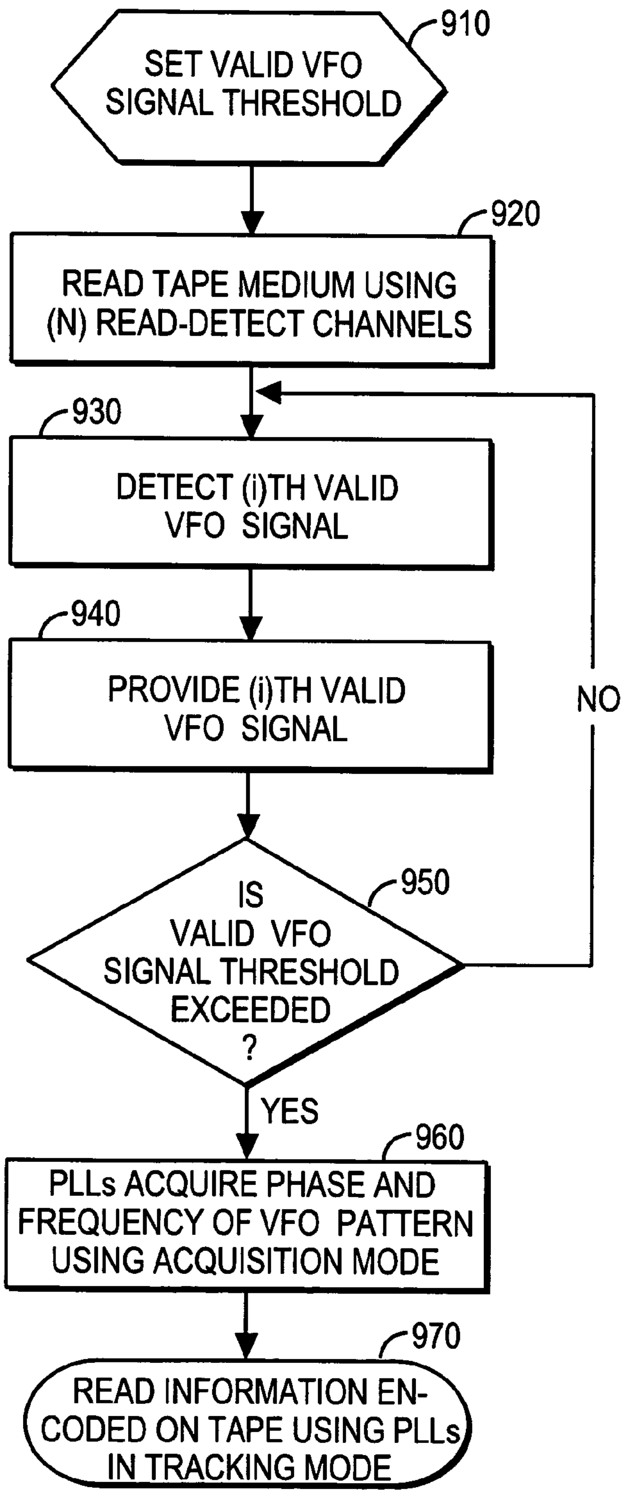
FIG. 9 is a flow chart summarizing prior art methods to sequentially detect a plurality of calibration signals and then to determine the frequency and phase of those calibration signals.

FIG. 9 summarizes prior art methods to sequentially detect calibration signals disposed in a calibration region, determine if an adequate number of valid calibration signals are detected, and then determine the frequency and phase of the calibration signals using a peak detection read channel comprising a peak detection PLL circuit. Referring now to FIG. 9, in step 910 the prior art method establishes a valid VFO signal threshold.

In step 920, as the tape head passes over the VFO region of a tape, one or more VFO pattern detectors, such as VFO pattern detectors disposed in data flow logic 497 (FIGS. 5A, 6), become activated. Each channel includes at least one VFO pattern detector. In certain embodiments, data flow logic 497 is disposed in a controller, such as controller 136 (FIGS. 1, 3)/146 (FIGS. 1, 3), disposed in a data storage device.

In step 930, as the (i)th VFO pattern detector disposed in the (i)th read channel recognizes a VFO signal. The prior art method transitions from step 930 to step 940 wherein that prior art method generates a signal, i.e. the (i)th valid VFO signal, indicating that a valid VFO field is being read. Each channel generates such a signal, and provides that signal to the data flow logic. A voting process takes place within the data flow logic to determine whether to activate the acquisition signal to the PLLs.

In step 950, the prior art method determines if the number of channels detecting a valid VFO region exceed the pre-determined threshold of step 910. If the prior art method determines in step 950 that the number of channels detecting a valid VFO region exceed the pre-determined threshold, then the method transitions from step 950 to step 960 wherein an acquisition line is asserted and the PLL, such as PLL 565 (FIGS. 5A, 5B), disposed in a peak detection read channel, such as the read channel of FIG. 5A, begins to acquire the phase and frequency of the VFO pattern. In step 970, the prior art method reads information encoded on the tape storage medium using the phase and frequency determined in step 960 and a read channel configured in a tracking mode, such as the tracking architecture of FIG. 4A and PLL 465 (FIGS. 4A, 4B).

Thus, this prior art method of FIG. 9 comprises a sequential operation, i.e. VFO voting followed by VFO signal acquisition. This prior art sequential operation necessitates an extended VFO region. On the other hand, if VFO voting and signal acquisition could be performed simultaneously, then the length of the VFO region could be reduced. Reducing the length of the VFO region necessarily increases the amount of tape available for customer data, i.e. necessarily increases the useful capacity of the tape.

Figure 10:
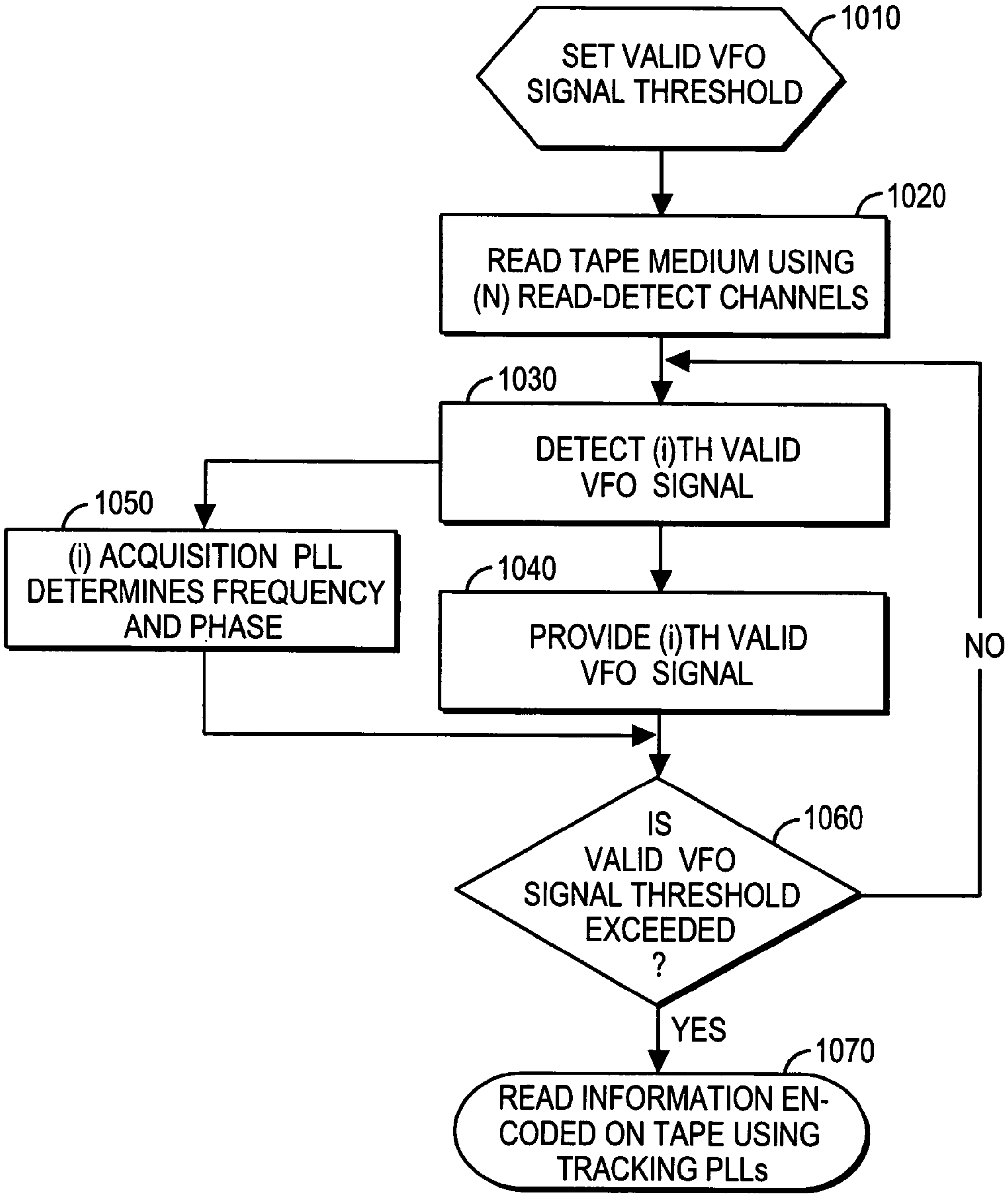
FIG. 10 is a flow chart summarizing the steps of Applicant's method to simultaneously detect a plurality of valid calibration signals while determining the frequency and phase of one or more of those valid calibration signals.

FIG. 10 summarizes the steps of Applicant's method. Referring now to FIG. 10, in step in step 1010 Applicant's method establishes a valid VFO signal threshold. In certain embodiments, the valid VFO signal threshold of step 1010 is set in firmware disposed in a data storage device, such as tape drive 130 (FIGS. 1, 3). In certain embodiments, the valid VFO signal threshold of step 1010 is set in firmware disposed in a controller, such as controller 136 (FIGS. 1, 3), disposed in a data storage device, such as tape drive 130. In certain embodiments, the valid VFO signal threshold of step 1010 is set in firmware disposed in a host computer, such as host computer 390 (FIGS. 1, 3). In certain embodiments, the valid VFO signal threshold of step 1010 is set in firmware disposed in a library controller, such as controller 150, disposed in a data storage and retrieval system, such as data storage and retrieval system 100.

In step 1020, the tape medium is moved across a tape head, such as tape head 200. Each read/write device disposed on tape head 200 is interconnected with one of Applicant's read/detect channel 600. Therefore, a tape head comprising (N) read/write elements is interconnected with up to (N) read channels 600.

Applicant's method transitions from step 1020 to step 1030 where, as the tape head passes over the VFO region of a tape, one or more VFO pattern detectors, such as VFO pattern detectors disposed in data flow logic 497 (FIGS. 5A, 6), become activated. Each channel includes at least one VFO pattern detector. In certain embodiments, data flow logic 497 is disposed in a controller, such as controller 136/146, disposed in a data storage device. In step 1030, the (i)th VFO pattern detector disposed in the (i)th read channel recognizes the (i)th valid VFO signal, where (i) is greater than or equal to 1 and less than or equal to (N).

Applicant's method transitions from step 1030 to both step 1040 and step 1050. In step 1040, Applicant's method generates a signal, i.e. the (i)th valid VFO signal, indicating that the (i)th valid VFO field is being detected. Each of the (N) channels generates such a signal, and provides that signal to data flow logic 497. Simultaneously, in step 1050 the (i)th read/detect channel 600, using first PLL component 701, is determining the frequency and phase of the (i)th VFO signal.

Steps 1040 and 1050 transition to step 1060 wherein Applicant's method determines if the number of channels detecting a valid VFO region exceed the pre-determined threshold of step 1010. If Applicant's method determines in step 1060 that the number of channels detecting a valid VFO region exceed the pre-determined threshold, then the method transitions from step 1060 to step 1070 wherein the method loads register contents from the acquisition PLL component 701 (FIG. 7) to the tracking PLL component 702 (FIG. 7).

Referring again to FIG. 7, first order loop filter 740 comprises a plurality of first loop filter data registers 745. Second order loop filter 750 comprises a plurality of second loop filter data registers 755. In step 1070, the contents of the first loop filter data registers 745 are loaded into the second loop filter data registers 755 via communication lines 710 and 720. Phase integrator 576 comprises first phase integrator data registers 765. Phase integrator 469 comprises second phase integrator data registers 775. In step 1070, the contents of the first phase integrator data registers 765 are loaded into the second phase integrator data registers 775 via communication link 730.

Referring again to FIG. 10, Applicant's method transitions from step 1070 to step 1080 wherein Applicant's method reads information encoded in the tape medium using read/detect channel 600 (FIG. 6) and second PLL component 702 (FIG. 7).

In certain embodiments, individual steps recited in FIG. 10 may be combined, eliminated, or reordered.

Applicant's invention includes an article of manufacture comprising a computer useable medium, such as computer useable medium 132 (FIG. 3)/142 (FIG. 3), having computer readable program code disposed therein to method to read calibration information from a tape information storage medium while acquiring a plurality of valid calibration signals using read/detect channel 600 and the steps of FIG. 10. Applicant's invention further includes a computer program product, such as computer program product 134 (FIG. 3)/144 (FIG. 3), usable with a programmable computer processor having computer readable program code embodied therein to read calibration information from a tape information storage medium while acquiring a plurality of valid calibration signals using read/detect channel 600 and the steps of FIG. 10. Such computer program products may be embodied as program code stored in one or more memory devices, such as a magnetic disk, a magnetic tape, or other non-volatile memory device.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to read calibration information from a tape information storage medium while acquiring a plurality of valid calibration signals, wherein said tape medium includes a calibration region comprising the steps of:

providing (N) read/detect channels, wherein each of said (N) read/detect channels comprises a PLL circuit having a first PLL component interconnected with a second PLL component, wherein said first PLL component comprises a phase detector, a first loop filter having a first gain, and a first phase integrator;

setting a valid calibration signal threshold;

detecting at a first time the (i)th valid calibration signal, wherein (i) is greater than or equal to 1 and less than or equal to (N);

determining at said first time the frequency and phase of said (i)th valid calibration signal using the first PLL component disposed in the (i)th read/detect channel;

determining if said valid calibration signal threshold is exceeded;

operative if said valid calibration signal threshold is exceeded, providing said frequency and phase to said second PLL component;

reading information encoded on said tape medium using said second PLL component.

2. The method of claim 1, wherein said second PLL component comprises a second loop filter having a second gain, and a second phase integrator.

3. The method of claim 2, further comprising the step of adjusting said first gain to be greater than said second gain.

4. The method of claim 1, wherein each of said (N) read/detect channels comprises a peak detection component interconnected with said first PLL component.

5. The method of claim 4, wherein said peak detection component comprises:

an equalizer;

a tracking threshold module interconnected to said equalizer;

a peak detector interconnected to said tracking threshold module and interconnected to said first PLL component.

6. The method of claim 4, wherein each of said (N) read/detect channels comprises a feedback loop interconnected to said second PLL component.

7. The method of claim 1, wherein each of said (N) read/detect channels comprises:

an equalizer;

a tracking threshold module interconnected to said equalizer;

a peak detector interconnected to said tracking threshold module;

said PLL circuit, wherein said PLL circuit is interconnected to said peak detector;

a mid-linear filter interconnected to said equalizer;

a phase interpolator interconnected to said PLL circuit;

a sample interpolator interconnected to said mid-linear filter and to said phase interpolator;

a phase error generator interconnected to said PLL circuit;

a gain control module interconnected to said sample interpolator and to said phase error generator; and a maximum likelihood detector interconnected to gain control module.

8. The method of claim 7, further comprising the step of providing information from said peak detector to said first PLL component.

9. The method of claim 8, further comprising the step of providing information from said phase error generator to said second PLL component.

10. An article of manufacture comprising a computer useable medium having computer readable program code disposed therein to read calibration information from a tape information storage medium while acquiring a plurality of valid calibration signals, said article of manufacturing comprising a read/detect channel comprising a PLL circuit having a first PLL component interconnected with a second PLL component, wherein said first PLL component comprises a phase detector, a first loop filter having a first gain, and a first phase integrator, wherein said tape medium includes a calibration region, the computer readable program code comprising a series of computer readable program steps to effect:

receiving a valid calibration signal threshold;

detecting at a first time a calibration signal;

determining at said first time the frequency and phase of said calibration signal using said first PLL component;

determining if said valid calibration signal threshold is exceeded;

operative if said valid calibration signal threshold is exceeded, providing said frequency and phase to said second PLL component;

reading information encoded on said tape medium using said second PLL component.

11. The article of manufacture of claim 10, wherein said second PLL component comprises a second loop filter having a second gain, and a second phase integrator.

12. The article of manufacture of claim 11, said computer readable program code further comprising a series of computer readable program steps to effect adjusting said first gain to be greater than said second gain.

13. The article of manufacture of claim 10, wherein said read/detect channel comprises a peak detection component interconnected with said first PLL component.

14. The article of manufacture of claim 13, wherein said peak detection component comprises:

an equalizer;

a tracking threshold module interconnected to said equalizer;

a peak detector interconnected to said tracking threshold module and interconnected to said first PLL component.

15. The article of manufacture of claim 13, wherein said read/detect channel comprises a feedback loop interconnected to said second PLL component.

16. The article of manufacture of claim 10, wherein said read/detect channel comprises:

an equalizer;

a tracking threshold module interconnected to said equalizer;

a peak detector interconnected to said tracking threshold module;

said PLL circuit, wherein said PLL circuit is interconnected to said peak detector;

a mid-linear filter interconnected to said equalizer;

a phase interpolator interconnected to said PLL circuit;

a sample interpolator interconnected to said mid-linear filter and to said phase interpolator;

a phase error generator interconnected to said PLL circuit;

a gain control module interconnected to said sample interpolator and to said phase error generator; and a maximum likelihood detector interconnected to gain control module.

17. The article of manufacture of claim 16, said computer readable program code further comprising a series of computer readable program steps to effect providing information from said peak detector to said first PLL component.

18. The article of manufacture of claim 17, said computer readable program code further comprising a series of computer readable program steps to effect providing information from said phase error generator to said second PLL component.

19. A computer program product usable with a programmable computer processor having computer readable program code embodied therein to read calibration information from a tape information storage medium while acquiring a plurality of valid calibration signals, said article of manufacturing comprising a read/detect channel comprising a PLL circuit having a first PLL component interconnected with a second PLL component, wherein said first PLL component comprises a phase detector, a first loop filter having a first gain, and a first phase integrator, and wherein said second PLL component comprises a second loop filter having a second gain, and a second phase integrator, wherein said tape medium includes a calibration region, comprising:

computer readable program code which causes said programmable computer processor to receive a valid calibration signal threshold;

computer readable program code which causes said programmable computer processor to detect at a first time a calibration signal;

computer readable program code which causes said programmable computer processor to determine at said first time the frequency and phase of said calibration signal using said first PLL component;

computer readable program code which causes said programmable computer processor to determine if said valid calibration signal threshold is exceeded;

computer readable program code which, if said valid calibration signal threshold is exceeded, causes said programmable computer processor to provide said frequency and phase to said second PLL component;

computer readable program code which causes said programmable computer processor to read information encoded on said tape medium using said second PLL component;

computer readable program code which causes said programmable computer processor to adjust said first gain to be greater than said second gain.

20. The computer program product of claim 19, wherein said read/detect channel comprises:

an equalizer;

a tracking threshold module interconnected to said equalizer;

a peak detector interconnected to said tracking threshold module;

said PLL circuit, wherein said PLL circuit is interconnected to said peak detector;

a mid-linear filter interconnected to said equalizer;

a phase interpolator interconnected to said PLL circuit;

a sample interpolator interconnected to said mid-linear filter and to said phase interpolator;

a phase error generator interconnected to said PLL circuit;

a gain control module interconnected to said sample interpolator and to said phase error generator; and a maximum likelihood detector interconnected to gain control module, said computer program product further comprising computer readable program code which causes said programmable computer processor to provide information from said peak detector to said first PLL component.

21. The computer program product of claim 20, further comprising computer readable program code which causes said programmable computer processor to provide information from said phase error generator to said second PLL component.

22. A read/detect channel, comprising:

an equalizer;

a tracking threshold module interconnected to said equalizer;

a peak detector interconnected to said tracking threshold module;

a PLL circuit interconnected to said phase interpolator;

a mid-linear filter interconnected to said equalizer;

a phase interpolator interconnected to said PLL circuit;

a sample interpolator interconnected to said mid-linear filter and to said phase interpolator;

a phase error generator interconnected to said PLL circuit;

a gain control module interconnected to said sample interpolator and to said phase error generator; and a maximum likelihood detector interconnected to gain control module wherein said PLL circuit comprises a first PLL component and a second PLL component;

wherein said first PLL component comprises:

a phase detector interconnected to said peak detector;

a first loop filter having a first gain interconnected to said phase detector;

a first phase integrator interconnected to said first loop filter and to said phase detector.

23. The read/detect channel of claim 22, wherein said second PLL component comprises;

a second phase integrator interconnected to said first phase integrator and interconnected to said phase interpolator;

a second loop filter having a second gain interconnected to said first loop filter and interconnected to said second phase integrator.

24. The read/detect channel of claim 23, wherein said first gain is greater than said second gain.

25. A tape drive unit, comprising:

an equalizer;

a tracking threshold module interconnected to said equalizer;

a peak detector interconnected to said tracking threshold module;

a PLL circuit interconnected to said phase interpolator;

a mid-linear filter interconnected to said equalizer;

a phase interpolator interconnected to said PLL circuit;

a sample interpolator interconnected to said mid-linear filter and to said phase interpolator;

a phase error generator interconnected to said PLL circuit;

a gain control module interconnected to said sample interpolator and to said phase error generator;

a maximum likelihood detector interconnected to gain control module;

wherein said PLL circuit comprises a first PLL component and a second PLL component;

wherein said first PLL component comprises:

a phase detector interconnected to said peak detector;

a first loop filter having a first gain interconnected to said phase detector;

a first phase integrator interconnected to said first loop filter and to said phase detector;

and wherein said second PLL component comprises:

a second phase integrator interconnected to said first phase integrator and interconnected to said phase interpolator;

a second loop filter having a second gain interconnected to said first loop filter and interconnected to said second phase integrator.

* * * * *